United States Patent [19]
Mitsuda

[11] Patent Number: 5,983,567
[45] Date of Patent: Nov. 16, 1999

[54] SAFETY DEVICE FOR AUTOMATIC WINDOW OPENING AND CLOSING

[75] Inventor: Ryoichi Mitsuda, Yokkaichi, Japan

[73] Assignee: Sumitomo Wiring Systems, Ltd., Japan

[21] Appl. No.: 09/061,520

[22] Filed: Apr. 16, 1998

Related U.S. Application Data

[63] Continuation of application No. 08/775,592, Dec. 31, 1996, abandoned, which is a continuation of application No. 08/457,986, Jun. 1, 1995, abandoned.

[30] Foreign Application Priority Data

Jun. 24, 1994 [JP] Japan ................................ 6-143513

[51] Int. Cl.⁶ .................................................. E05F 15/02
[52] U.S. Cl. .................................................. 49/26; 49/506
[58] Field of Search ................................ 49/26, 27, 28, 49/31, 197, 506; 160/1

[56] References Cited

U.S. PATENT DOCUMENTS

| | | | |
|---|---|---|---|
| 4,511,832 | 4/1985 | Schmitz | 318/685 |
| 4,621,223 | 11/1986 | Murakami et al. | 49/28 |
| 5,351,439 | 10/1994 | Takeda et al. | 49/28 |
| 5,404,673 | 4/1995 | Takeda et al. | 49/28 |
| 5,459,379 | 10/1995 | Takeda et al. | 49/28 |

*Primary Examiner*—Daniel P. Stodola
*Assistant Examiner*—Curtis A. Cohen
*Attorney, Agent, or Firm*—Jordan B. Bierman; Bierman, Musherlian and Lucas

[57] ABSTRACT

A safety device for an automatic window opening and closing mechanism which includes a first detector for detecting a foreign object caught in the window, when the relative velocity decrease detected by a first relative velocity detector is greater than a first reference value, with the window in a safety control range; and a second velocity detector to detect a yielding foreign object caught in the window. When a plurality of successive changes in closing velocity of the window are detected and the sum of the changes calculated by calculator is greater than a second reference value, a release instruction is given to the motor driving circuit based on the detection result of the first or second detecting means to stop or drive the motor in an opening direction, thereby ensuring stable detection of the foreign object, even if it is soft, and to prevent the foreign object from being caught in the window.

6 Claims, 9 Drawing Sheets

SAFETY DEVICE FOR AUTOMATIC WINDOW OPENING AND CLOSING

This Application is a Continuation of Ser. No. 08/775,592, filed Dec. 31, 1996, now abandoned; which is a Continuation of Ser. No. 08/457,986, filed Jun. 1, 1995, now abandoned.

BACKGROUND OF THE INVENTION

1. Field of the Invention

The present invention relates to a safety device for an automatic window opening and closing mechanism which is adapted to prevent a window in a vehicular door and roof from catching vehicle occupant's hand, neck and head when the window is closed by the automatic window opening and closing mechanism.

2. Description of the Prior Art

Conventionally, window panes of power windows and motor driven sunroofs are driven to automatically open and close by a motor, and such an accident sometimes happens that a vehicle occupant catches his hand and neck between a window pane and a window frame due to carelessness. To prevent such an accident, various safeguards have been devised for detecting a foreign object caught in a closing window pane to release the foreign object. An example of the safeguards includes a device disclosed in Japanese Patent Application Laid-Open No. 5-321530 (1993).

Referring to FIG. 4, the device is designed such that an automotive window pane 1 is opened and closed by an opening and closing mechanism 2 provided in a vehicular body under the window pane 1. Specifically, the opening and closing mechanism 2 includes a rail 3 extending in the vertical direction of the body, a slider 4 slidable vertically along the rail 3, and a wire 5 coupled to the slider 4 and mounted on pulleys 6 disposed at upper and lower ends of the rail 3 to be coupled to a power window driving portion 7 in such a manner that the slider 4 moves up and down by way of the wire 5 when the power window driving portion 7 is driven. The slider 4 is secured to a lower portion of the window pane 1, and a window space defined by a window frame 8 is opened and closed when the window pane 1 is moved upwardly and downwardly together with the slider 4.

The power window driving portion 7 includes a motor 9 serving as a driving power source. The motor 9 moves the wire 5 round to vertically move the window pane 1. For example, the window pane 1 moves upwardly to close the window when the motor 9 rotates in the forward direction, and moves downwardly to open the window when the motor 9 rotates in the reverse direction.

Referring to FIG. 5, a circular magnet 10 is fixed on a rotary shaft 9a of the motor 9. A pair of Hall elements 11a and 11b are disposed in different angular positions at a 90° interval with respect to the rotary shaft 9a around the magnet 10 to form a pulse signal generating means 11. Since the Hall elements 11a, 11b produce a current upon detection of the magnetic poles of the magnet 10, the rotation of the magnet 10 resulting from the rotation of the motor 9 causes each of the Hall elements 11a, 11b to output a pulse signal having a frequency responsive to the speed of rotation.

FIG. 6 is a block diagram of the device. As illustrated in FIG. 6, the power window driving portion 7 is connected to a vehicle mounted power supply 21 and a function switch 22 such as a window opening switch and a window closing switch through a control unit 20. The control unit 20 includes a microcomputer 30. Output terminals of the Hall elements 11a, 11b serving as the pulse signal generating means 11 are connected to the microcomputer 30 through a sensor input circuit 23, and the microcomputer 30 is adapted to detect the speed and direction of rotation of the motor 9 in response to input pulse signals from the Hall elements 11a, 11b.

Opposite ends of the motor 9 serving as a driving power source are connected to the vehicle mounted power supply 21 through change-over contacts of two relays 24a, 24b and are grounded. Relay coils of the relays 24a, 24b are connected to the microcomputer 30 through a relay output circuit 26. Switching of the relays 24a, 24b under control of the microcomputer 30 allows the motor 9 to rotate in the forward and reverse directions.

The function switch 22 is connected to the microcomputer 30 through a switch input circuit 27 to select functions for switching between automatic and manual operations of the window and switching between opening and closing of the window. The vehicle mounted power supply 21 is connected to a power supply terminal of the microcomputer 30 through a constant voltage source 28 and is connected to the microcomputer 30 through an A/D converter 29 for analog-to-digital conversion of the output voltage from the vehicle mounted power supply 21.

FIG. 7 is a block diagram illustrating functions of the microcomputer 30. As shown in FIG. 7, the microcomputer 30 includes a system for detecting a safety control range in which the window pane 1 catching a foreign object should release the foreign object from a current position of the window pane 1, and a system for detecting the foreign object caught in the window pane 1.

The system for detecting the safety control range includes an opening and closing direction detecting means 31 for detecting the opening and closing directions of the window. The opening and closing direction detecting means 31, for example as shown in FIGS. 8A and 8B, binarizes the pulse signals outputted from the Hall elements 11a, 11b into two-bit signals to detect the direction of rotation of the motor 9 by detecting periodicity of variations in the two-bit signal values, thereby to detect the resultant opening and closing directions of the window. For example, when the order in which the two-bit signal values change is "2, 3, 1, 0" as shown in FIG. 8B, then it is judged that the motor 9 rotates in the forward direction. When the order in which the two-bit signal values change is "1, 3, 2, 0" as shown in FIG. 8A, then it is judged that the motor 9 rotates in the reverse direction.

The system for detecting the safety control range further includes a current position detecting means 32 having an up-down counter for detecting the current position of the window pane 1 indicative of the degree of opening and closing of the window pane 1. The current position detecting means 32 initially sets the count to zero when the window is fully closed. For example, the current position detecting means 32 counts the pulse signal in the negative direction when the motor 9 rotates in the forward direction and in the positive direction when the motor 9 rotates in the reverse direction to detect the current position of the window pane 1 in response to the count.

The system for detecting the safety control range further includes a safety control range judging means 33 for judging a predetermined range between a fully open position of the window and a nearly closed position thereof in response to the output from the current position detecting means 32 to perform control such that the window pane 1 catching the foreign object releases the foreign object only in the predetermined range.

In the nearly closed position of the window, the window pane 1 contacts the window frame 8, and the contact resistance causes a state similar to the state in which the foreign object is caught in the window pane 1. This position is used to prevent faulty detection at this time. In this device, the safety control range is defined as extending from the fully open position of the window to about 90% closed position of the window as shown in FIG. 4. A first output of the safety control range judging means 33 is applied to a first input of an AND gate 34, and a second output thereof is applied to an operation instructing means 35 serving as a catch release instructing means.

The system for detecting the foreign object caught in the window pane 1 includes an absolute velocity detecting means and a relative velocity detecting means.

The absolute velocity detecting means 36 detects a time interval between the turning on of a switch for opening and closing the window and the next rising edge of the pulse signal or between the adjacent rising edges of the pulse signal to judge whether or not the rotational speed of the motor 9, or the absolute velocity of the opening and closing window pane 1, is higher than a preset reference velocity. A first catch detecting means 37 detects the catch of the foreign object in the window pane 1 when the absolute velocity detected by the absolute velocity detecting means 36 is lower than the reference velocity, e.g. when the rotational speed of the motor 9 is less than 20 ms/rotation.

The relative velocity detecting means 38 detects time intervals between successive cycles of the pulse signal to derive angular velocity components of the motor 9 from the reciprocals of the time intervals. The relative velocity detecting means 38 then determines the amounts of change in opening and closing velocity which are detected as relative velocities. A second catch detecting means 39 detects the catch of the foreign object in the window pane 1 when the relative velocities are lower than a constant value, e.g. when the relative velocities are lowered by 10% or more from a steady value.

The outputs from the first and second catch detecting means 37, 39 are applied respectively to first and second inputs of an OR gate 40 which in turn provides an output to a second input of the AND gate 34. The output from the AND gate 34 is applied to a safety control operation instructing mean 41. Upon receipt of a catch detection signal from at least one of the first and second catch detecting means 37, 39, with the current position of the window pane 1 falling within the safety control range, the safety control operation instructing means 41 permits the operation instructing means 35 to operate to provide a catch release instruction to a motor driving circuit 42 to be described later. The motor driving circuit 42 in turn controls the motor 9 to open the window pane 1, for example, so that the window pane 1 moves 12 cm from the current position thereof in the opening direction.

It is needless to say that the operation instructing means 35 receives a signal from the function switch 22 to cause the motor 9 to rotate in the forward or reverse direction. The output from the operation instructing means 35 is applied to the motor 9 through the motor driving circuit 42 including the relay output circuit 26 and the relays 24a, 24b to control the rotation of the motor 9.

FIG. 9 illustrates characteristics (relation between an angular velocity $\omega$ and a load torque T) of general d.c. motors. A threshold level of the absolute velocity of the opening and closing window pane 1 determines a threshold level $\omega 0$ of the angular velocity of the motor 9 associated therewith, thereby determining a threshold level T0 of the load torque.

However, the conventional safety device for detecting the catch of the foreign object in the window pane 1 on the basis of the relative velocities does not ensure the detection of the catch since the relative velocities do not become lower than the constant value if the absolute velocity of the opening and closing window pane 1 changes gradually, e.g. when the window pane 1 catches a soft object.

In such a case, the device detects the catch on the basis of the absolute velocity, not on the basis of the relative velocities. However, when the window is opened and closed under the above described motor characteristics conditions, variations in friction between the window pane 1 and the window frame 8 or between the rail 3 and the slider 4 and in load such as an external force due to other factors might cause the angular velocity of the motor 9 to vary to $\omega 1$, $\omega 2$ depending upon the current position of the window pane 1 if the load torque T0 is constant as shown in FIG. 9. The variations in angular velocity vary the load torque of the motor 9 by T1, T2 from the threshold level T0 serving as a detection reference of the absolute velocity, resulting in unstable catch detection independently of the current position of the window pane 1.

SUMMARY OF THE INVENTION

The present invention is intended for a safety device for an automatic window opening and closing mechanism for preventing a vehicular window from catching vehicle occupant's hand, neck and head when the vehicular window is closed by the automatic window opening and closing mechanism. According to a first aspect of the present invention, the safety device comprises: an openable and closable window pane of a window in a vehicular door and roof; driving means for opening and closing the window pane in response to operation of an opening switch and a closing switch, respectively; relative velocity detecting means for detecting as a relative velocity the amount of change in velocity at which the window pane is closed by the driving means, if detected; calculating means for calculating the sum of the amounts of a plurality of successive changes in closing velocity of the window pane, if detected; first catch detecting means for detecting a foreign object caught in the window pane when the relative velocity detected by the relative velocity detecting means is greater than a first reference value; second catch detecting means for detecting the foreign object caught in the window pane when the sum of the amounts of changes calculated by the calculating means is greater than a second reference value; and catch release instructing means for applying a catch release instruction to the driving means in response to a detection result of the first or second catch detecting means.

Preferably, according to a second aspect of the present invention, the driving means includes a motor and means for converting rotation of the motor into linear motion to move the window pane, and the safety device further comprises: pulse signal generating means adjacent a rotary shaft of the motor for outputting a pulse signal having a frequency responsive to the rotational speed of the motor, wherein the relative velocity detecting means calculates the amount of change in closing velocity of the window pane from the reciprocal of a time interval of the pulse signal outputted from the pulse signal generating means to detect the relative velocity.

Preferably, according to a third aspect of the present invention, the safety device further comprises: current position detecting means for detecting a current position of the window pane; and controller for inhibiting operation of the catch release instructing means when the position of the window pane detected by the current position detecting means falls outside a safety control range in which detection of the foreign object caught in the window pane is required to be performed.

In the first aspect of the present invention, the first catch detecting means detects the foreign object caught in the window pane when the relative velocity detected by the relative velocity detecting means is greater than the first reference value. The second catch detecting means detects the foreign object caught in the window pane when the plurality of successive changes in closing velocity of the window pane are detected and the sum of the amounts of changes calculated by the calculating means is greater than the second reference value. The catch release instructing means applies the release instruction to the driving means in response to the detection result of the first or second catch detecting means. Therefore, if a soft object is caught in the window pane, the object caught in the window pane is detected by the functions of the calculating means and the second catch detecting means. This ensures stable detection of the catch of the foreign object in the window pane.

In the second aspect of the present invention, the relative velocity of the closing window pane is detected by calculating the amount of change in closing velocity of the window pane from the reciprocal of the time interval of the pulse signal from the pulse signal generating means.

In the third aspect of the present invention, the safety device is controlled such that the catch release instructing means is not operated when the position of the window pane detected by the current position detecting means falls outside the safety control range, thereby preventing faulty operation.

It is therefore an object of the present invention to ensure stable detection of a foreign object caught in a window.

These and other objects, features, as and advantages of the present invention will become more apparent from the following detailed description of the present invention when taken in conjunction with the accompanying drawings

DESCRIPTION OF THE PREFERRED EMBODIMENTS

Figure 1:
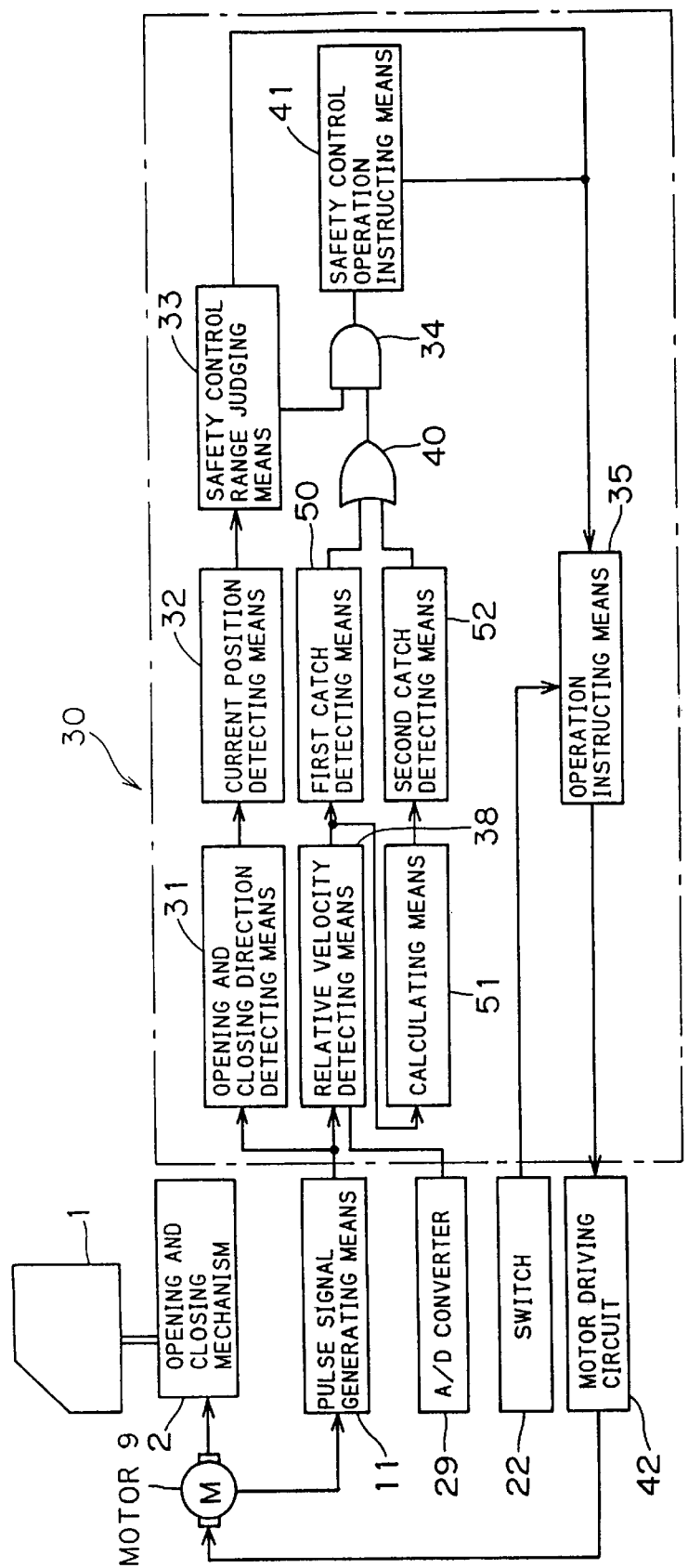
FIG. 1 is a block diagram of portions of a preferred embodiment according to the present invention.
Figure 7:
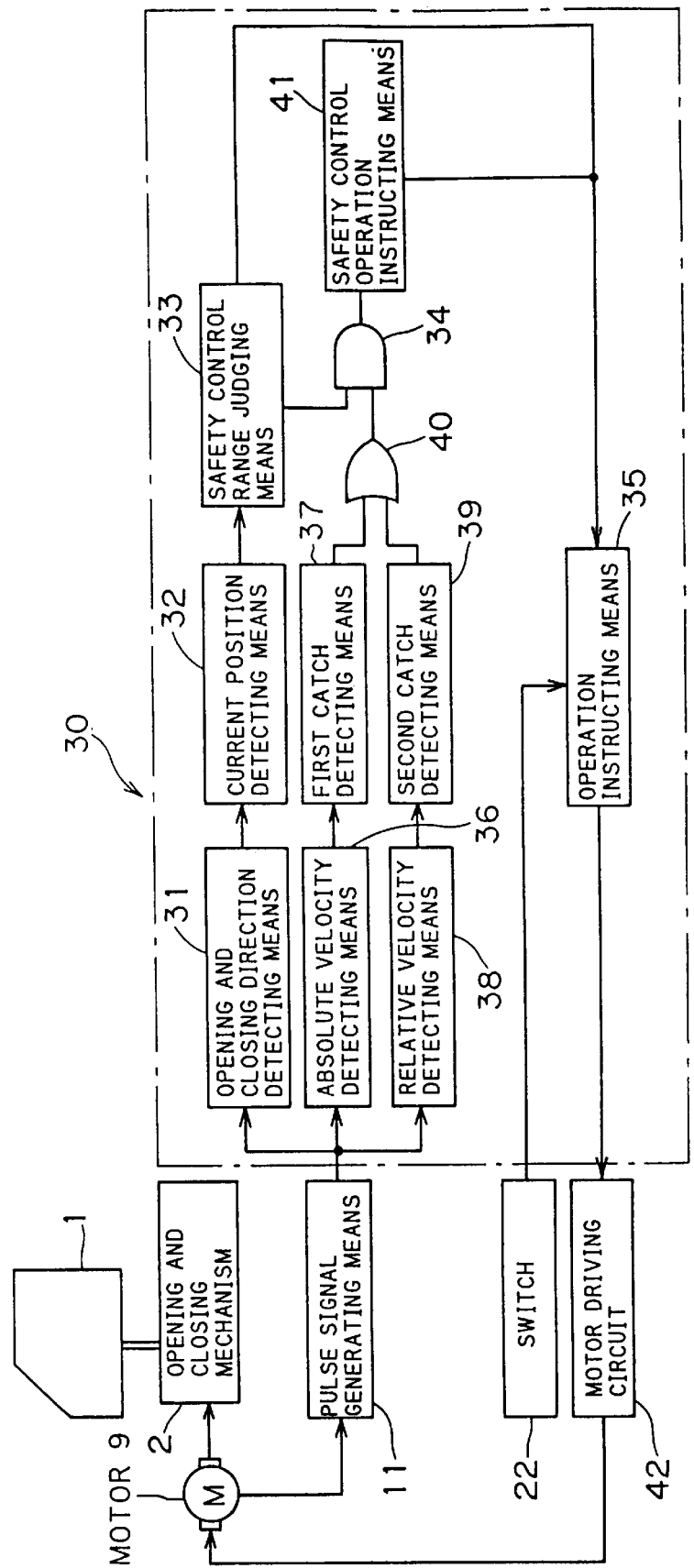
FIG. 7 is a block diagram of portions of FIG. 6.
Figure 8A:
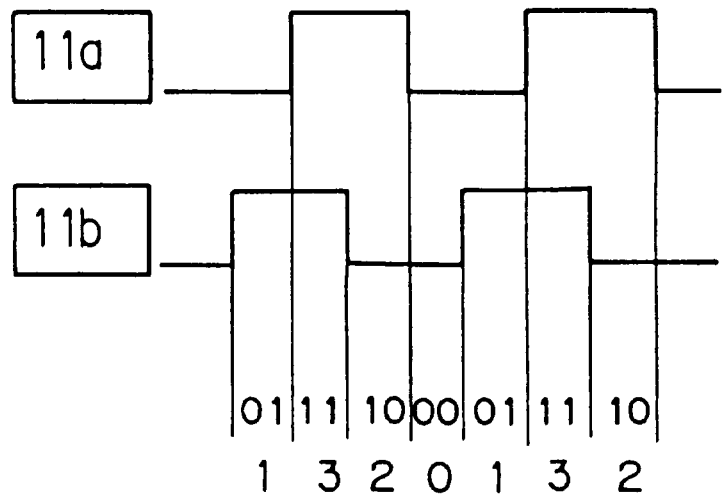
FIGS. 8A, 8B, 9 illustrate the operation of the conventional safety device.
Figure 8B:
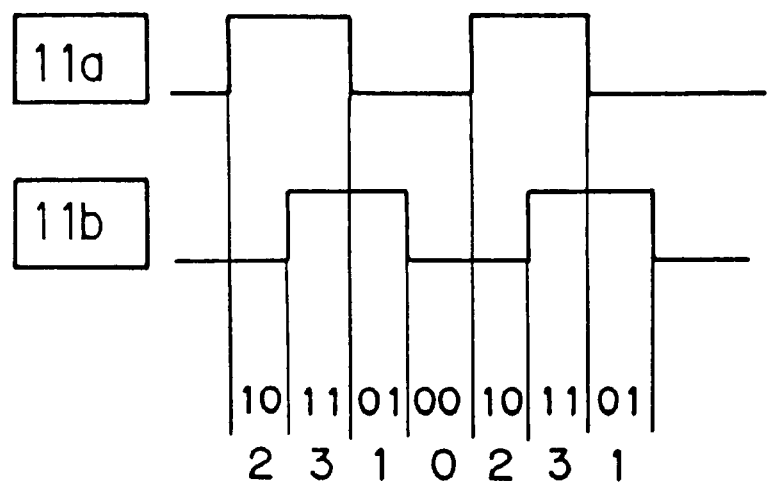
Figure 9:
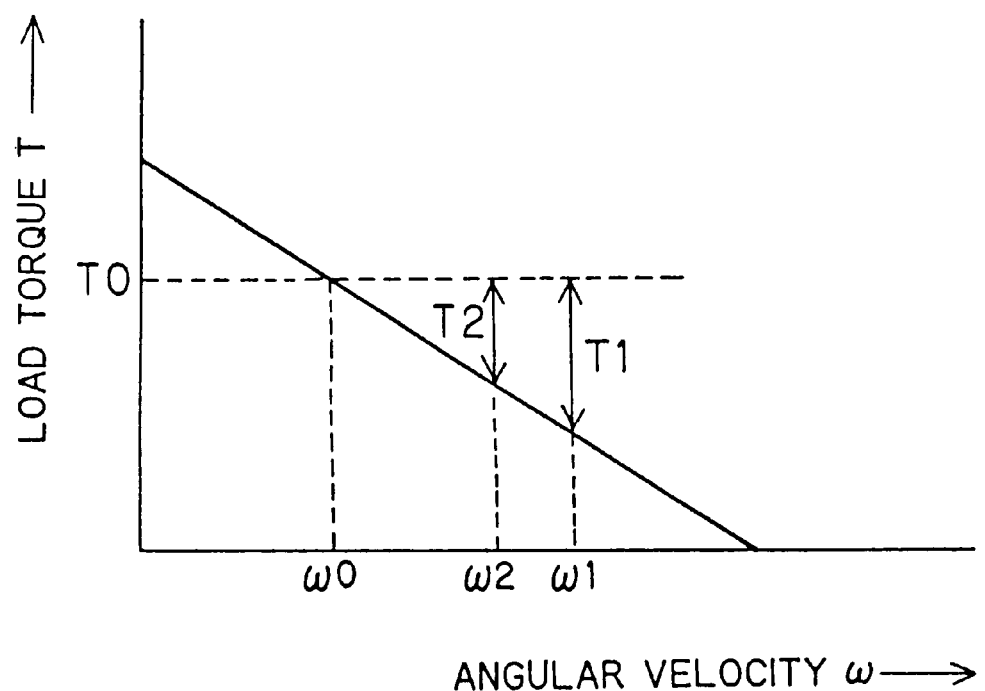

In FIG. 1, like reference numerals and characters are used to designate portions corresponding to or identical with those of FIG. 7. The differences from the device of FIG. 7 will be described below.

A first catch detecting means 50 detects a foreign object caught in the window pane 1 when the relative velocity detected by the relative velocity detecting means 38 is greater than a first reference value (e.g., "8"). The absolute velocity detecting means 36 of FIG. 7 is replaced with a calculating means 51 for calculating the sum of the amounts of a plurality of (e.g., five) successive changes in closing velocity of the window pane 1, if detected. A second catch detecting means 52 detects the foreign object caught in the window pane 1 when the sum of the amounts of changes in relative velocity calculated by the calculating means 51 is greater than a second reference value (e.g., "8"). The outputs from the first and second catch detecting means 50, 52 are applied respectively to first and second inputs of the OR gate 40, and the output from the A/D converter 29 is applied to the relative velocity detecting means 38.

The relative velocity detecting means 38 monitors the power supply voltage to convert the time intervals of the pulse signal at this time into time intervals at a reference voltage (e.g., 13 V). The relative velocity detecting means 38 derives the angular velocity components of the motor 9 from the reciprocals of the time intervals to determine the amounts of changes in closing velocity of the window pane 1 which are detected as the relative velocities.

The first reference value "8" of the relative velocity is used when the rotational speed of the motor 9 is reduced by about 2 rotations/second.

Figure 2:
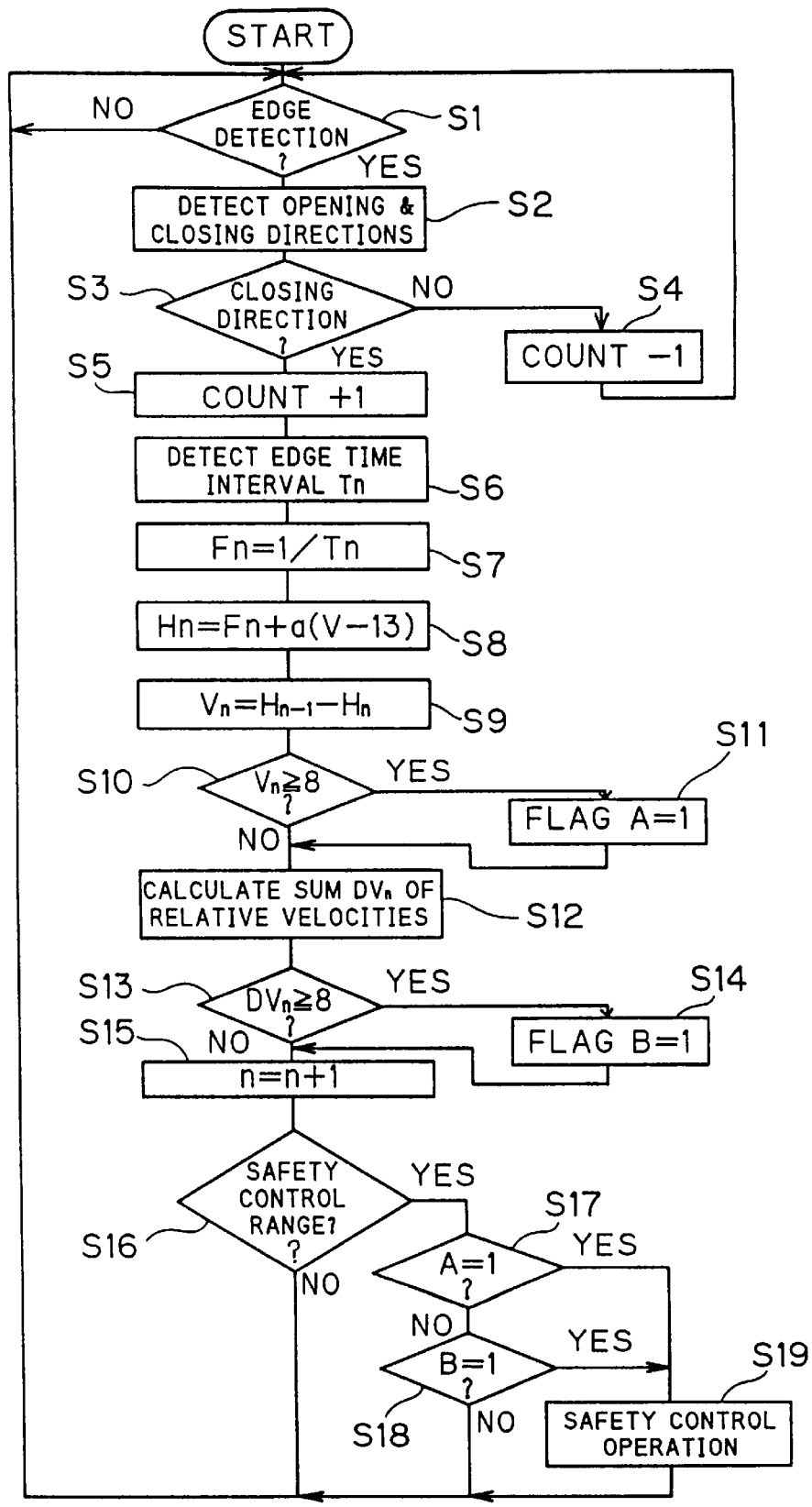
FIG. 2 is a flow chart for illustrating the operation of the preferred embodiment.

The operation will be discussed below with reference to the flow chart of FIG. 2.

As the switch 22 is turned on, the rotation of the motor 9 permits the Hall elements 11a, 11b of the pulse signal generating means 11 to apply pulse signals to the microcomputer 30. It is judged whether or not an edge of the pulse signal is detected (process step S1). If the judgement result is NO, the judgement is repeated until the result becomes YES. If the judgement result is YES, the opening and closing direction detecting means 31 detects the opening and closing directions of the window pane 1 for each edge detection (process step S2). It is judged whether or not the detection result is the closing direction (process step S3).

When the judgement result in the process step S3 is NO, that is, when the direction of the window pane 1 is the opening direction, it is judged that the window pane 1 has no probability of catching a foreign object, and the count of a built-in counter in the current position detecting means 32 is decremented by one (process step S4). Then the flow returns to the process step S1. On the other hand, when the judgement result in the process step S3 is YES, the count of the built-in counter in the current position detecting means 32 is incremented by one (process step S5), and the flow continues into the process step S6.

The relative velocity detecting means 38 detects an edge time interval $T_n$ between a detected pulse signal edge of interest (n–th edge) and its preceding pulse signal edge ((n−1)–th edge) detected (process step S6). To convert the edge time interval $T_n$ into an angular velocity component $F_n$ of the motor 9, the reciprocal of the edge time interval $T_n$ is derived and defined as angular velocity component data $F_n$ (=$1/T_n$) (process step S7).

Reference voltage correction data $H_n$ (=$F_n$+a (V−13)) are derived from a power supply voltage V which is analog-to-digital converted by the A/D converter 29 and a voltage correction coefficient a for conversion of the voltage V into a reference voltage (process step S8). A relative velocity $V_n$ (=$H_{n-1}-H_n$) is detected from the correction data $H_n$ and the preceding correction data $H_{n-1}$ (process step S9). The detected relative velocity $V_n$ is compared with the preset first reference value "8" (process step S10). If the relative velocity $V_n$ is equal to or greater than the first reference value, a flag A of the first catch detecting means 50 is set to "1" (process step S11) and the flow proceeds to the process step S12. If the relative velocity $V_n$ is less than the first reference value, the flow directly proceeds to the process step S12.

The calculating means 51 calculates the sum $DV_n$ of the detected relative velocity $V_n$ and four preceding relative velocities $V_{n-4}, V_{n-3}, V_{n-2}, V_{n-1}$ thereof (process step S12). The calculated sum $DV_n$ is compared with the second reference value "8" (process step S13). If the sum $DV_n$ is equal to or greater than the second reference value, a flag B of the second catch detecting means 52 is set to "1" (process step S14), and the flow proceeds to the process step S15. If the sum $DV_n$ is less that the second reference value, the flow directly proceeds to the process step S15.

Then "1" is added to n (process step S15). It is judged whether or not the current position of the window pane 1 falls within the safety control range (process step S16). If the judgement result is NO, it is judged that the window pane 1 need not perform the release action and the flow returns to the process step S1. If the judgement result in the process step S16 is YES, it is judged whether or not the flag A is "1" (process step S17). If the judgement result is NO, it is then judged whether or not the flag B is "1" (process step S18). If the judgement result is NO, it is judged that the window pane 1 need not perform the release action and the flow returns to the process step S1.

When the judgement result in the process step S17 is YES or the judgment result in the process step S18 is YES, the flow proceeds to the process step S19 for safety control operation. The safety control operation instructing means 41 is operated in response to the output from the AND gate 34 to permit the operation instructing means 35 to operate. In response to the operation permission, the operation instructing means 35 applies a catch release instruction to the motor driving circuit 42 to switch the relays 24a, 24b through the relay output circuit 26. Then the motor 9 is driven in the opening direction, and the window pane 1 is moved 15 cm from the current position thereof in the opening direction to release the foreign object. The flow then returns to the process step S1.

Figure 3A:
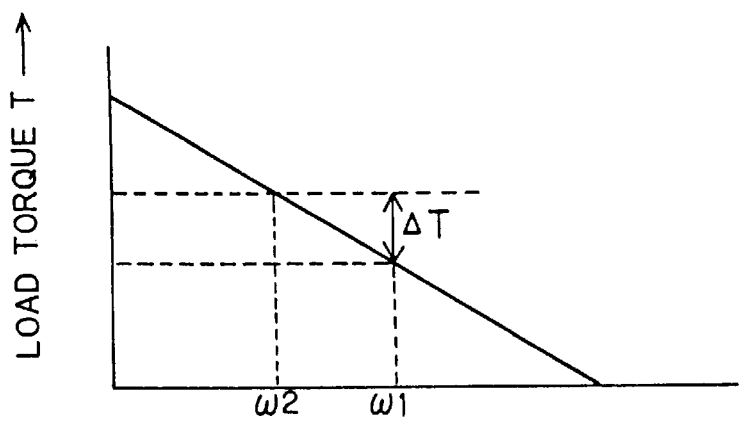
FIGS. 3A, 3B, 3C illustrate the operation of the preferred embodiment.

Referring to FIG. 3A, when the angular velocity of the motor 9 changes from $\omega 1$ to $\omega 2$, the relative velocity is expressed by $(\omega 1 - \omega 2)$ corresponding to the amount of change $\Delta T$ in load torque. The relative velocity may be detected with constant sensitivity by constantly comparing the amount of change $\Delta T$ with the threshold level T0.

Figure 3B:
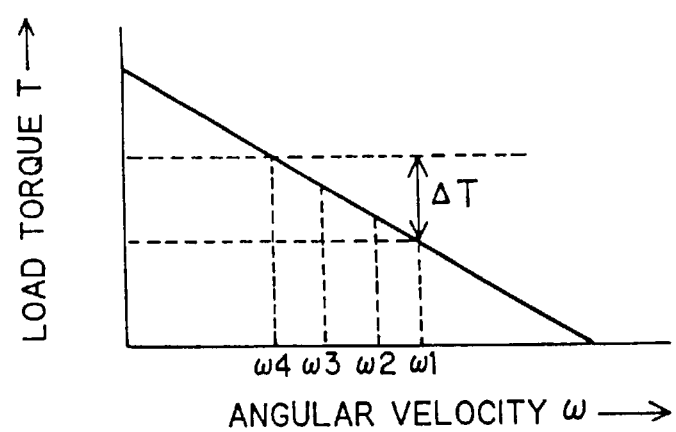

In the case where a soft object is caught in the window pane 1, the calculating means 51 calculates the sum of the amounts of three successive changes in relative velocity, for example, if the angular velocity of the motor 9 gradually changes from $\omega 1$ through $\omega 2, \omega 3$ to $\omega 4$ as shown in FIG. 3B. At this time, the amount of change in load torque is equivalent to $\Delta T$. The relative velocity may be detected with constant sensitivity by constantly comparing the amount of change $\Delta T$ with the threshold level T0 of the load torque.

Figure 3C:
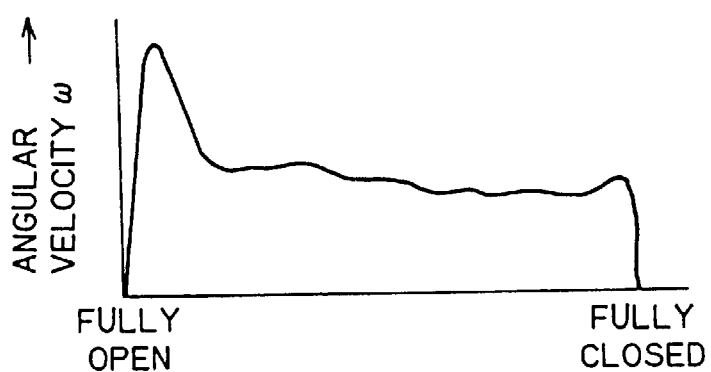
Figure 4:
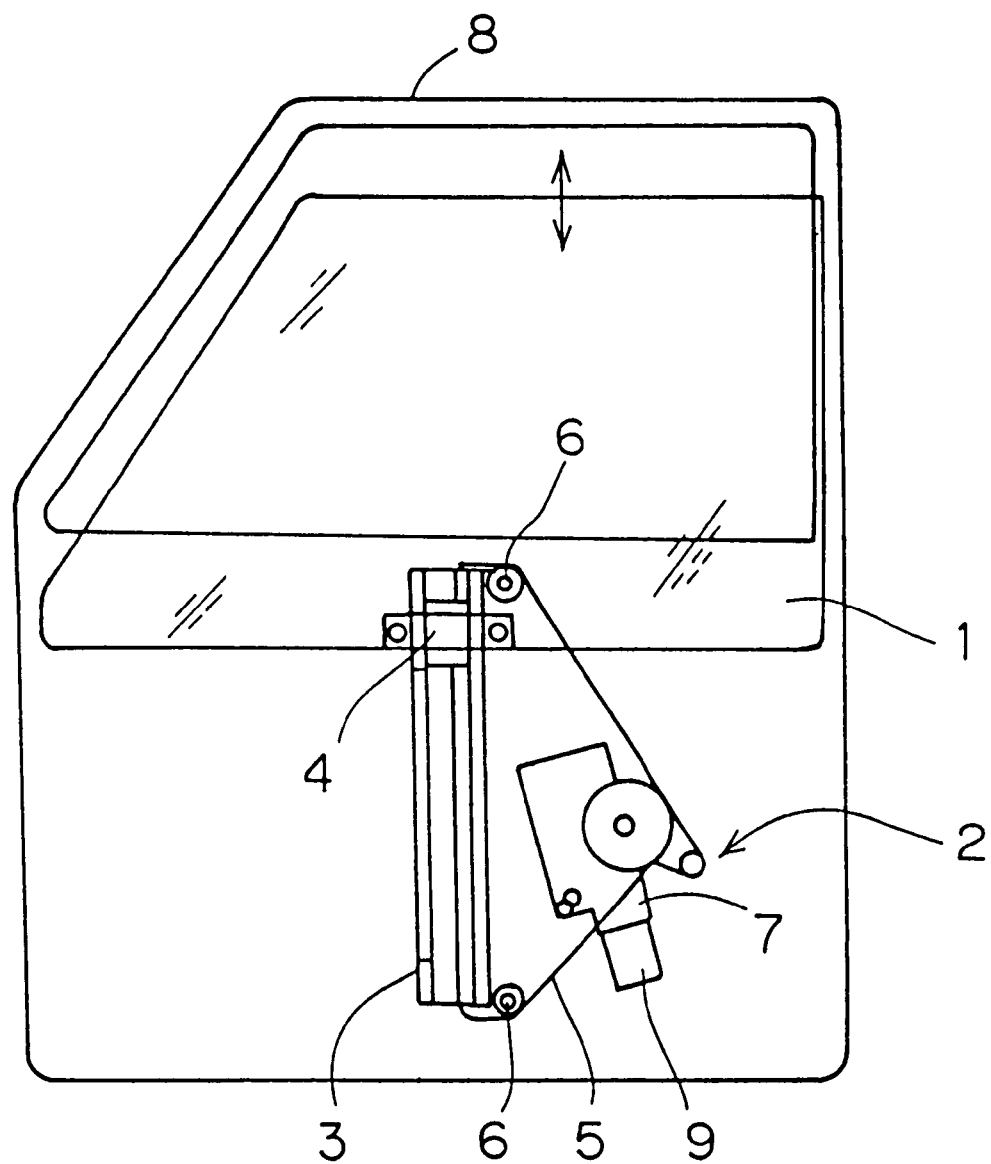
FIG. 4 schematically illustrates a conventional safety device.
Figure 5:
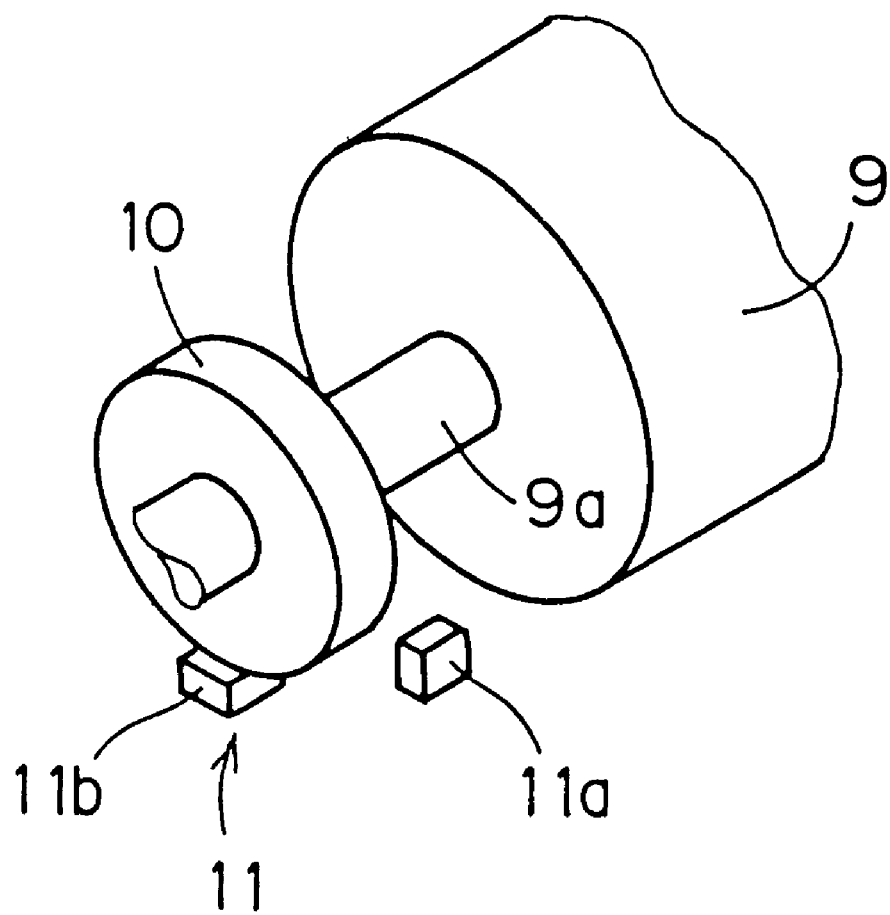
FIG. 5 is a fragmentary perspective view of the conventional safety device.
Figure 6:
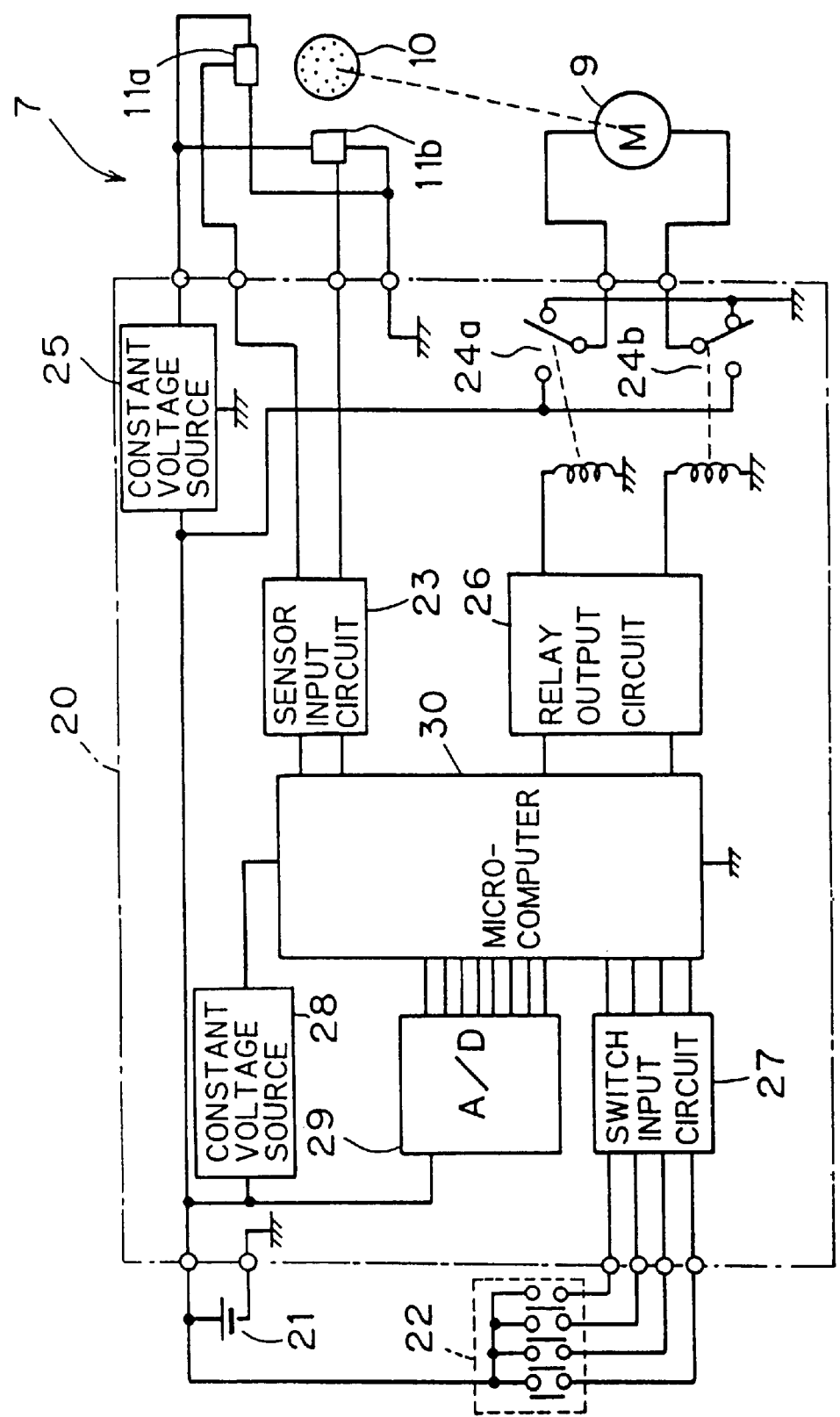
FIG. 6 is a block diagram of a control circuit of the conventional safety device.

FIG. 3C illustrates the angular velocity characteristic of the motor 9 during the opening and closing operations of the window pane 1 at that time. The angular velocity of the motor 9 changes depending upon the friction between the window pane 1 and the window frame 8 as above described, but the number of sum calculations by the calculating means 51 is previously set to a value empirically determined which enables the angular velocity of the motor 9 to be taken as constant in the normal opening and closing operations of the window pane 1. That is, FIG. 3C shows that the angular velocity of the motor 9 increases rapidly the moment the motor 9 starts in the fully opened position of the window. The angular velocity shifts to a stable state after reaching a peak and decreases rapidly. Furthermore, when the window is nearly closed, the angular velocity reaches a peak once and then decreases rapidly until the fully closed position is reached. Therefore, timing is empirically determined for the angular velocity to shift to a stable state after starting and then reaching a first, large peak thereof, and the relative velocity can be detected after the stable state as mentioned above begins. Moreover, the sum DVn of the latest detected relative velocity Vn and relative velocities Vn–4, to which the latest detected relative velocity Vn goes back a predetermined number of times (five times, for example) can be calculated.

When the window pane 1 lying within the safety control range, the first catch detecting means 50 detects the foreign object caught in the window pane 1 when the relative velocity detected by the relative velocity detecting means 38 is greater than the first reference value, and the second catch detecting means 52 detects the foreign object caught in the window pane 1 when a plurality of successive changes in velocity of the closing window pane 1 are detected and the sum of the amounts of changes calculated by the calculating means 51 is greater than the second reference value. Since the operation instructing means 35 applies the catch release instruction to the motor driving circuit 42 in response to the detection result of the first or second catch detecting means 50 or 52, the foreign object, if a soft object, caught in the window pane 1 is detected by the calculating means 51 and the second catch detecting means 52, insuring stable detection of the caught foreign object.

The relative velocity of the closing window pane 1 is readily detected by calculating the amount of change in velocity of the closing window pane 1 from the reciprocal of the time interval of the pulse signal from the pulse signal generating means 11.

Further, the operation instructing means 35 does not output the catch release instruction when the position of the window pane 1 detected by the current position detecting means 32 falls outside the safety control range, thereby preventing the conventional malfunction.

The present invention is applied to the vehicular power window in this preferred embodiment but may be applied to a motor driven sunroof to provide similar effects.

The construction of the respective means is not limited to that of the preferred embodiment.

The number of successive changes in relative velocity to be summed together by the calculating means 51 is not limited to five.

While the invention has been shown and described in detail, the foregoing description is in all aspects illustrative and not restrictive. It is therefore understood that numerous modifications and variations can be devised without departing from the scope of the invention.

I claim:

1. A safety device for an automatic window, slidable in an opening direction and a closing direction along a travel path, and used in connection with a mechanism for opening and closing said window, comprising a driver adapted to move said window in said path in response to an actuator, said device adapted to prevent said window from catching an impediment when closing said window, said device comprising:

a relative velocity detector for detecting a latest decrease in a relative closing velocity of said window, said latest decrease being calculated by detecting successive time intervals of a pulse signal to derive angular velocity components of said driver from reciprocals of said successive time intervals;

a first detector adapted to detect a foreign object in said travel path when said latest decrease detected by said relative velocity detector is greater than a first reference value;

a calculator for adding said latest decrease and a predetermined number of successive past decreases in relative velocity together to provide a sum thereof;

a second detector adapted to determine when said sum is greater than a second reference value, thereby indicating the presence of a foreign object in said travel path; and a control adapted to provide a release instruction to said driver based on a detection result from said first detector when said latest decrease is greater than said first reference value, and to provide said release instruction to said drive based on a detection result from said second detector when said latest decrease is less than said first reference value and said sum is greater than said second reference value, whereby said second detector is capable of instructing said control to provide said release function when said latest decrease is less than said first reference value, thereby to detect a softer foreign object than a foreign object detectable by said first detector.

2. The safety device of claim 1 comprising:

a current position detector for determining a current position of said window; and a third control for inhibiting operation of said first control when a limit position of said window pane detected by said current position detector is outside a safety control range in which detection of said impediment in said travel path is required to be performed.

3. The safety device of claim 2 wherein said limit position is adjacent a fully closed position of said window pane.

4. The safety device of claim 1 wherein said slidable window is in a door or a roof of a vehicle.

5. The safety device of claim 1 wherein said sum is preset so that said closing velocity of said window is stable, and determines said sum of decreases in said closing velocity per said predetermined number.

6. In a combination of an automatic window slidable in an opening and a closing direction along a travel path, and a device including a driver adapted to move said window along said path in response to an actuator, the improvement which comprises a safety device including:

a relative velocity detector for detecting a change in a relative closing velocity of said window;

a first detector for comparing said change with a first reference value and determining when said change is greater than said first reference value, thereby detecting a first-type impediment in said path;

a calculator for totaling said change and a predetermined successive number of previously detected changes, so as to determine a sum of said change and said previously detected changes;

a second detector for comparing said sum with a second reference value, said second detector adapted to detect a second-type impediment, which is more yielding than said first-type impediment in said path, when said sum is greater than said second reference value, whereby said second detector is capable of detecting said second-type impediment which said first detector is incapable of detecting when said change is less than said first reference value; and a first controller for delivering a release instruction to said driver in response to detection signals from said first detector, and said second detector, or both, whereby said device is capable of preventing said window from catching said first-type impediment or said second-type impediment in said path when closing said window.

* * * * *